(12) United States Patent
Hagel et al.

(10) Patent No.: US 8,747,042 B2
(45) Date of Patent: Jun. 10, 2014

(54) FASTENER WITH HARDENED THREADS

(75) Inventors: Gerald W. Hagel, Lombard, IL (US); Joel Houck, Lansing, IL (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 546 days.

(21) Appl. No.: 12/949,608

(22) Filed: Nov. 18, 2010

(65) Prior Publication Data

US 2011/0142569 A1 Jun. 16, 2011

Related U.S. Application Data

(60) Provisional application No. 61/262,455, filed on Nov. 18, 2009.

(51) Int. Cl.
*F16B 35/00* (2006.01)
*F16B 35/04* (2006.01)

(52) U.S. Cl.
USPC .......................... 411/383; 411/411; 411/426

(58) Field of Classification Search
USPC ......... 411/378, 383, 411, 412, 426, 900–901, 411/424, 438
See application file for complete search history.

(56) References Cited

U.S. PATENT DOCUMENTS

| | | | | |
|---|---|---|---|---|
| 240,780 A | * | 4/1881 | Smith | 74/458 |
| 1,181,971 A | * | 5/1916 | Lovell | 74/458 |
| 2,520,232 A | * | 8/1950 | Bereza | 411/423 |
| 4,693,654 A | * | 9/1987 | Bettini | 411/387.4 |
| 4,762,453 A | * | 8/1988 | DeCaro | 411/383 |
| 5,044,855 A | * | 9/1991 | Fukubayashi | 411/386 |
| 5,190,426 A | * | 3/1993 | Wieder et al. | 411/412 |
| 5,312,214 A | * | 5/1994 | Morton | 411/17 |
| 5,704,750 A | * | 1/1998 | Bartos et al. | 411/411 |
| 6,116,832 A | * | 9/2000 | Wolf et al. | 411/383 |
| 6,599,072 B1 | * | 7/2003 | Gerhard | 411/387.4 |
| 2010/0290858 A1 | * | 11/2010 | Hettich et al. | 411/21 |
| 2011/0142569 A1 | * | 6/2011 | Hagel et al. | 411/411 |

FOREIGN PATENT DOCUMENTS

| | | |
|---|---|---|
| DE | 4441716 A1 | 5/1996 |
| DE | 19852338 A1 | 5/2000 |
| EP | 0905389 A2 | 3/1999 |
| EP | 1498618 A2 | 1/2005 |
| WO | 2009121448 A1 | 10/2009 |

OTHER PUBLICATIONS

International Search Report mailed Feb. 17, 2011, in International Patent Application No. PCT/US2010/057261 filed Nov. 18, 2010.
English translation of Abstract of European Publication No. EP1498618, published Jan. 19, 2005.

(Continued)

*Primary Examiner* — Victor Batson
*Assistant Examiner* — Tyler Johnson
(74) *Attorney, Agent, or Firm* — Vierra Magen Marcus LLP

(57) ABSTRACT

A threaded fastener includes a shank having a first, threaded portion and a hardened thread portion. The shank includes a thread extending outwardly from a shank body over a first length of the shank. A second portion of the shank includes a groove positioned coincident with the thread and including a turn ratio equal to a turn ratio of the thread. The shank comprises corrosive resistant stainless steel. A coil of hardened steel engages the groove to fill the groove along the second portion.

15 Claims, 4 Drawing Sheets

(56) References Cited

OTHER PUBLICATIONS

English translation of Abstract of European Publication No. EP0905389, published Mar. 31, 1999.
English translation of Abstract of German Publication No. DE4441716, published May 30, 1996.
English translation of Abstract of German Publication No. DE19852338, published May 18, 2000.
English translation of Abstract of PCT Publication No. WO2009121448, published Oct. 8, 2009.
Notification Concerning Transmittal of International Preliminary Report on Patentability and Written Opinion mailed May 31, 2012, in International Patent Application No. PCT/US2010/057261 filed Nov. 18, 2010.
Amendment filed May 2, 2013, in European Application No. 10781793.4 filed Nov. 18, 2010.

* cited by examiner

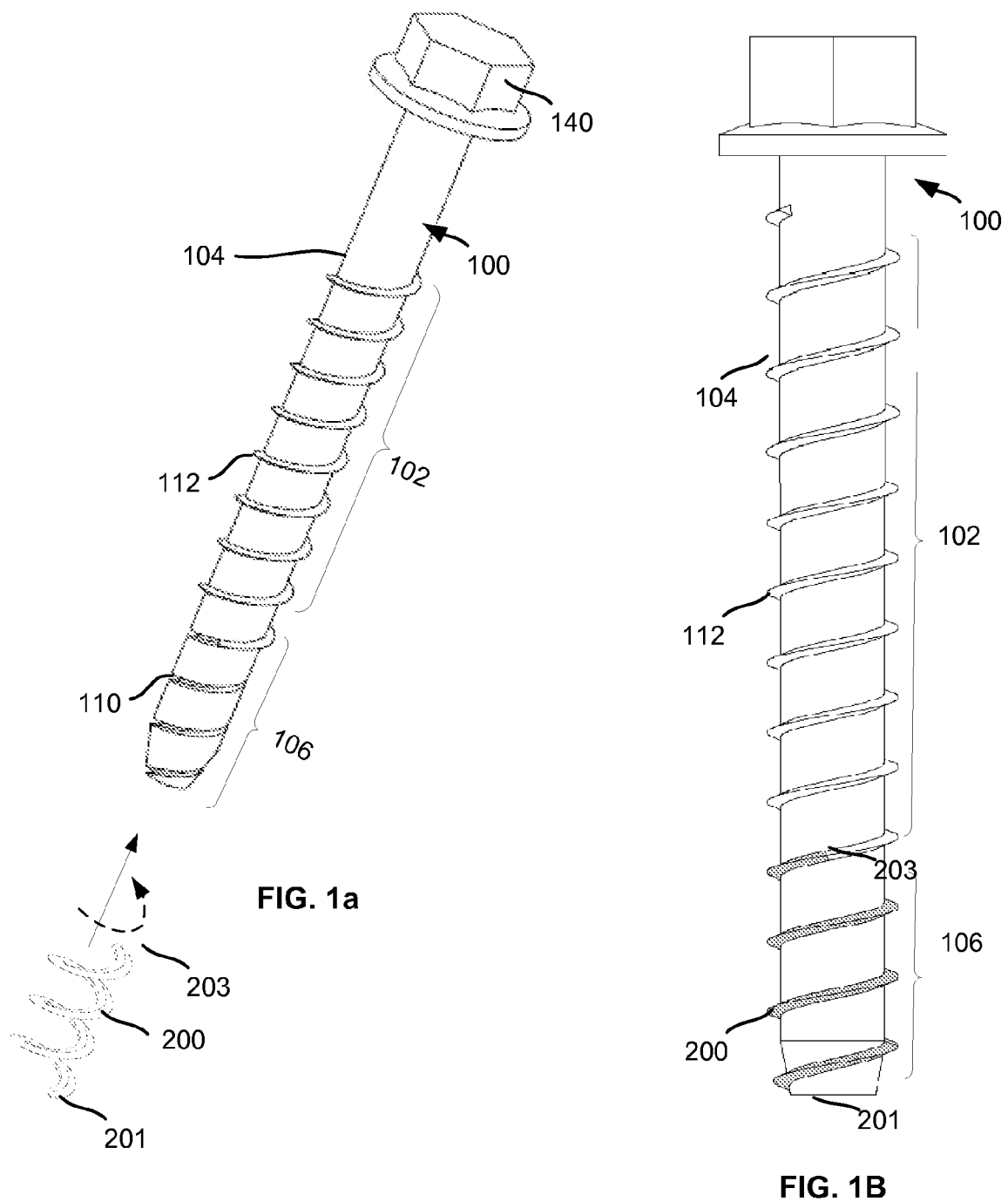

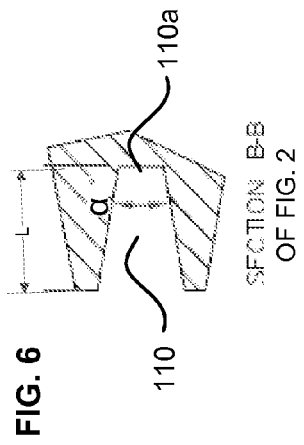
FIG. 6
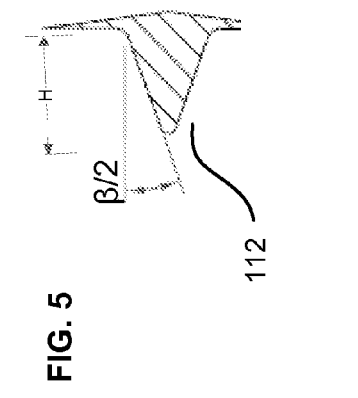
FIG. 5
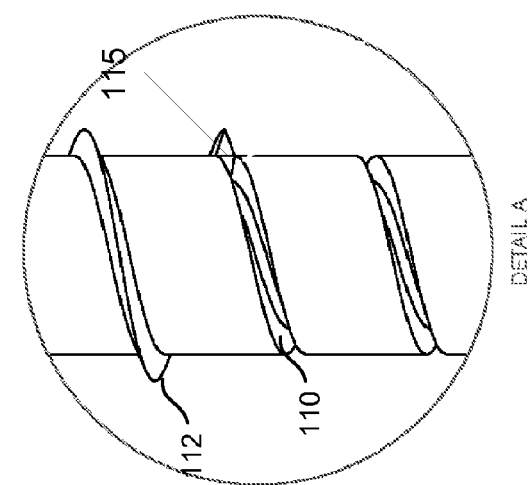
FIG. 3
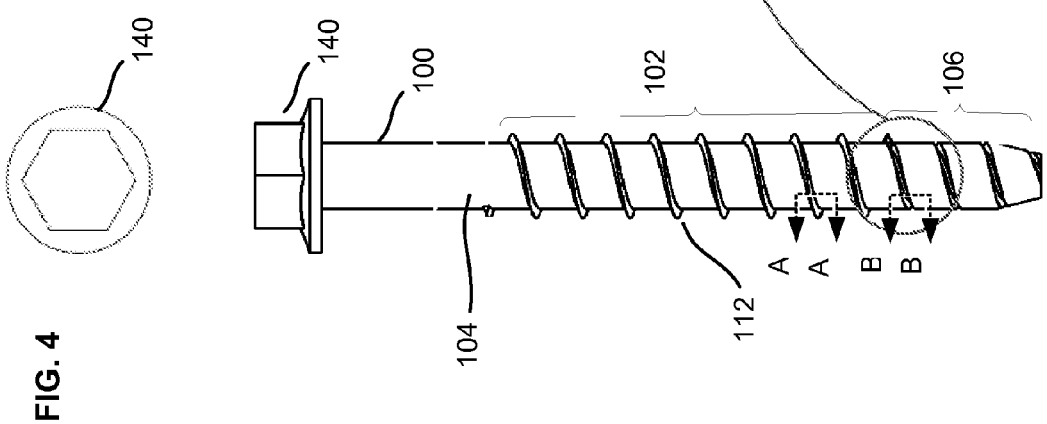
FIG. 4
FIG. 2

FASTENER WITH HARDENED THREADS

This application claims the benefit of U.S. Provisional Application Ser. No. 61/262,455, entitled COIL FASTENER, inventors Gerald W. Nagel and Joel Houck, filed Nov. 18, 2009.

BACKGROUND

A variety of fasteners can be used for anchoring structures in concrete or masonry. Self tapping anchors are generally formed of heat-hardened carbon steel.

Stainless steel provides good resistance to corrosion, but lacks the hardness required for self-tapping, heavy duty concrete fastener applications. Typically, such heavy duty fasteners require a very high hardness. A main challenge in using stainless steel for such applications involves the need to harden the tip of the fastener to a very high hardness in order to tap into the concrete.

Although 400 series stainless is capable of heat treatment and hardening, once heat treated, 400 series stainless loses a great deal of its corrosion resistant properties. In contrast, 300 series stainless has the corrosion resistance, however cannot effectively be heat treated to create the self tapping portion of the fastener.

One known solution is to create a bi-metal fastener, by welding or otherwise joining a carbon steel tip to the stainless body. This bi-metal part is then threaded and the carbon steel tip subsequently hardened. A bi metal solution is very expensive due to the number of manufacturing steps that are required.

SUMMARY

The technology, briefly described, comprises a fastener with hardened threads and a method for manufacturing the fastener. The fastener is provided with hardened threads over only a portion of the fastener shank, at a leading edge of the shank. The hardened threads are used for creating cuts in the bore while the balance of the threads are formed of the same material as the fastener itself.

A method for making the fastener is provided. A shank having a threaded portion and a portion including a groove is formed. The shank is formed of a highly corrosion resistant material. A coil thread formed of hardened material is attached to the shank in the groove. The coil thread may be hardened prior to attachment or after insertion into the groove, and may be secured in the groove by a number of techniques.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a perspective view of a fastener shank and coil positioned for attachment on the shank.

FIG. 1B is a perspective view of a fastener shank with coil attached.

FIG. 2 is a plan view of the fastener shank shown in FIG. 1.

FIG. 3 is an enlarged view of a portion of the fastener shank shown in FIG. 2

FIG. 4 is a top view of the fastener shank

FIG. 5 is a cross-section view along line A-A in FIG. 2.

FIG. 6 is a cross section view along line B-B in FIG. 2.

DETAILED DESCRIPTION

Figure 8:
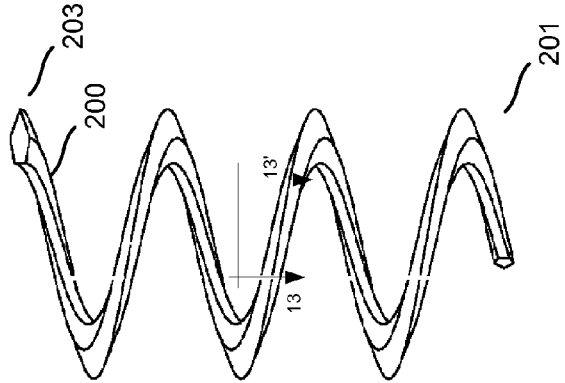
FIG. 8 is a plan view of the coil.
Figure 9:
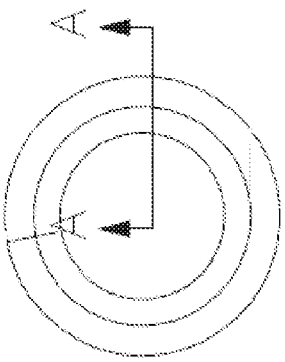
FIG. 9 is a top view of the coil.
Figure 7:
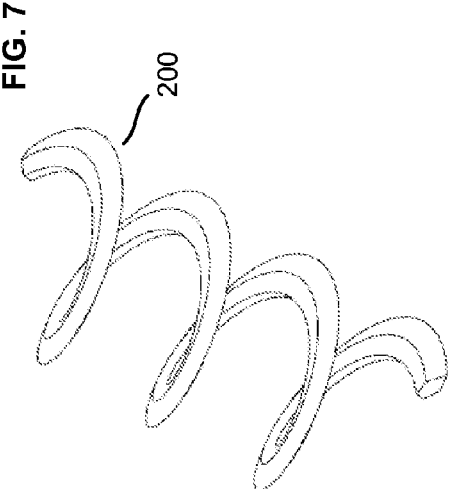
FIG. 7 is a perspective view of a coil having a cross section and shape configured to engage the shank shown in FIGS. 1-6.

A fastener with hardened threads and a method for manufacturing the fastener are provided. In one embodiment, the fastener is provided with hardened threads over only a portion of the fastener shank, at a leading edge of the shank. The hardened threads are used for creating cuts in the bore while the balance of the threads are formed of the same material as the fastener itself. This allows the fastener to be manufactured from corrosive resistant material, while the less corrosively resistant hardened material is kept to a minimum.

In another aspect, a method for making the fastener is provided. A shank having a threaded portion and a portion including a groove is formed. The shank is formed of a highly corrosion resistant material. A coil thread formed of hardened material is attached to the shank in the groove. The coil thread may be hardened prior to attachment or after insertion into the groove, and may be secured in the groove by a number of techniques.

FIGS. 1-10 present a first embodiment of a stainless steel fastener with a hardened thread portion suitable for use in concrete anchoring applications. The anchor generally comprises corrosion resistant material such as stainless steel, and a coil 200 formed in a profile which is identical to a thread profile formed in a shank 100 of a fastener. Typically, the coil 200 is formed of a material which is harder than the shank. In one embodiment, the material is a hardened metal, such as a carbon steel. Typically hardened metals are less corrosion resistant than stainless steel, but are harder and better able to penetrate concrete or other material used with the fastener. Coil 200 may be formed of other materials having a hardness superior to the stainless steel shank.

FIGS. 1A and 1B illustrate a perspective and plan view of an unassembled and assembled fastener 100, respectively. A corrosion resistant shank 104 is formed to include a first portion 102 illustrated in FIGS. 1A, 1B and 2 having a coiled, continuous thread 112 with a plurality of turns about and extending from the body 104 of the shank. The shank may have a head 140 at one end of the first portion. In alternative embodiments, any number of different types of securing ends may be provided in place of head 140. The shank may be formed using thread forming and thread rolling techniques wherein threads and grooves are formed into a blank by pressing a shaped die against the blank As illustrated in the Figures, a rolled thread 112 is formed on the first portion of the fastener while a groove or channel 110 is formed on the second portion of the fastener shank. As shown in FIG. 3, the channel portion and the thread portion meet at the intersection 115 of the first and second sections of the shank 100. The thread 112 and the channel 110 may have the same turn profile. In one embodiment, the shank 104 is formed out of series 300 stainless steel, such as type 316 or 304 stainless steel, to obtain the corrosive resistance properties of the steel. It should be recognized that other suitable corrosion resistant materials may be used. The profile of the thread 112 are illustrated in FIG. 5

The second portion 106 of the shank include channel 110 so that a coil 200 can be inserted therein to form fastener 100. The channel profile is illustrated in cross-section in FIG. 6. The coil 200 is illustrated in FIGS. 7-10. The coil 200 will be inserted into the channel and secured to the shank 100 by any number of techniques.

Coil 200 is formed to include a number of turns sufficient to allow the coil to be inserted into channel 110 from the intersection 115 to the end of the shank 104. When inserted into the groove, coil 200 forms a single continuous thread from a first end of the coil 201 to a second end 203, with thread 112 extending from a point near the first end of the shank to a second end at head 140. The number of turns provided in the first portion 102 and second portion 106 of the shank can vary such that the number of turns of channel (and a corresponding coil for such channel) in the second portion may be less than, equal to or greater than the number of turns in the first portion.

Coil 200 has a thread section 204 and a base section 202. The base section has a profile (illustrated in FIG. 10) which mates with the profile of the channel 110, illustrated in FIG. 6. Base section 202 may be formed in a generally trapezoidal shape, with the sides of the trapezoid having a total included angle alpha which, in one embodiment may be 20 degrees, and vary over a range of 0-60°. Channel 110 is formed with a mating profile to receive portion 202. Channel 110 has a depth L similar to the length of the base section 202. Coil thread section 204 may be formed of a generally triangular shape having a total included angle beta of 40 degrees. Beta may vary over a range of 40-60°. As illustrated in FIG. 5, the total included angle of a thread 112 is the same as thread section 204. Each thread 112 has a height H which is equivalent to the height H of section 204.

Figure 12:
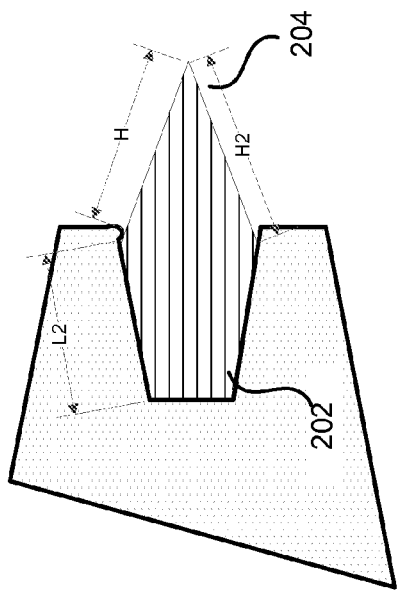
FIG. 12 is a partial cut-away sectional view of an assembled coil section mechanically secured in a groove.

In one embodiment, the coil is attached to the shank before a hardening process takes place. In another embodiment, the coil is hardened prior to attaching the coil to the shank.

Where hardening occurs prior to attaching the coil to the shank, a low-temperature attachment scheme is used. For example, the coil may be secured by a mechanical attachment, such rolling an edge of the groove over a portion of the coil along the length of the coil, a cross-section of which is illustrated in FIG. 12. Alternatively, the coil may be secured in the groove by an adhesive, soldering or another low temperature process. Any suitable hardening process may be used.

Where a hardening process is used after securing the coil to the shank, a fastening process such as spot, MIG or other welding of the coil 200 in place may be used. Alternative attachment processes include resistance welding and high temperature soldering. Hardening after securing the coil to the shank may take place through use of an induction hardening process, wherein the coil 200 is heated by induction heating and then quenched or allowed to cool.

Figure 10:
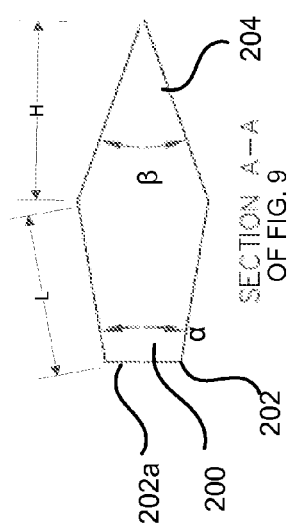
FIG. 10 is a cross-sectional view along line A-A in FIG. 9.

As illustrated in FIG. 10, a cross-section of the coil 200, the inner portion of the coil has a profile similar to that of the channel or groove 110. This allows the channel coil fit securely into the channel.

This fastener solution means that the only portion of the stainless fastener that will require heat treating is the coil, which will result in a tremendous cost savings.

The coil portion is made from hardened, heat treated carbon steel, or any alternate material (metal or non-metal) having a hardness superior to that of the shank. When joined to the shank 100, the coil acts to create the threads into the concrete, leading the thread 112 attached to the body into concrete.

The hardened coil 200 will actually create the threads in concrete; however, anchor loads are supported by the balance of the shank and threads 112. For load bearing purposes, load support can ignore the front end of the screw where the coil is located, and support for the entire capacity of the anchor may be based on first end 102 of the screw.

Figure 11:
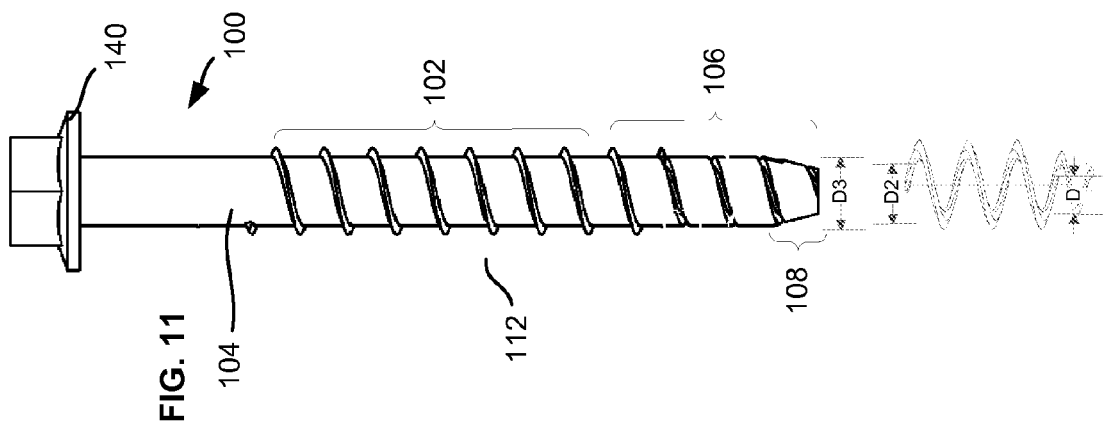
FIG. 11 is a plan view of a second embodiment of a fastener in accordance with the present technology.

FIG. 11 illustrates another embodiment of the fastener. Shank 104 includes a leading edge section 108 having a taper with a smaller diameter toward the leading end of the fastener 100. As illustrated in FIG. 11, the shank 104 has a diameter D3 defined by the surface of the shank. The base 110a (FIG. 6) of the channel defines a second diameter D2, corresponding to the inner diameter of the coil 200 defined by edge 202a of base portion 202. In one embodiment, shank 104 includes a region 108 having a decreasing diameter, and the leading end of the coil has a diameter D, smaller than the diameter D2 of the channel in the second portion 106 outside of region 108, to match the diameter D defined by base 110a in region 108.

It should be understood that the amount taper provided of this leading end section 108, and the corresponding reduction in the diameter of the coil, may vary in a number of ways, including length, taper and number of turns provided in the leading edge section 108.

FIG. 12 illustrates another embodiment of the fastener wherein the coil section 204 is manufactured with a slightly longer thread section of length H2 greater than H, and channel formed to depth L2 greater than L. This allows the coil 200 to be seated lower in the channel 110 and an edge 250 of the channel rolled on the coil along the entire length of turns of the coil, or swaged at discrete points along the length of the coil, to secure the coil in the channel 110. Note that the height H of the thread section extending above the surface of the shank remains at H—equivalent to the height of the thread 112 in the first section of the shank.

Figure 13:
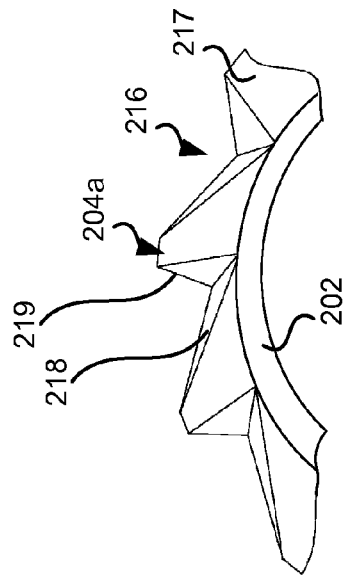
FIG. 13 is a partial, cross sectional view of the thread section along line 13-13 in FIG. 8.

FIG. 13 shows an additional variation on the present technology wherein the thread section 204a of the coil 200 is interrupted at intervals by recesses 216 to form cutting teeth 217 with a cutting edge 217a directed in the screw-in direction of the screw. FIG. 13 is a cross sectional view of the thread section 204a along line 13-13" in FIG. 8. The pitch of the cutting teeth is chosen, for instance, such that from six to thirty teeth per turn will result, depending on the diameter. The recesses 216 which interrupt the thread 204a are designed so that a planar surface 218 will be formed at the root of the recess, and cutting flanks 219 define the teeth 217. The teeth 217 may be formed along the entire length of the coil between the first end 201 and the second end 203, or may be formed over only a part of the coil length at, for example the first or leading end 201.

The embodiment of FIG. 13 may be formed in accordance with the teachings of U.S. Pat. No. 5,674,035, hereby fully incorporated by reference.

The technology has advantages over fasteners having an end portion of hardened, less corrosive material joined to the end of a shank. With welded, hardened tip fasteners, the less corrosion resistant tip will eventually corrode, and the corrosion product can expand to several times the volume of the original tip, creating a large amount of pressure in the concrete. Hence, a fastener with the welded tip cannot be used close to the edge of a concrete slab because the pressure will overcome the strength of the concrete and cause a breakout of the edge resulting in a loss of holding capacity. With the instant technology, the volume of less corrosion resistant material is much smaller, so there is little to no pressure created by the expanding corrosion product.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener comprising:
   a shank formed from a corrosion resistant material having a threaded portion including a thread extending outwardly from the shank and formed from the corrosion resistant material, and a second portion including a groove formed in the second portion, the groove having a trapezoidal cross-sectional profile;
   a thread component comprised of a material having a greater hardness than the shank and engaging the second portion of the shank by mating with the groove.

2. The fastener of claim 1 wherein the corrosion resistant material comprises a series 300 stainless steel and the thread component comprises carbon steel.

3. The fastener of claim 1 wherein the thread component includes a base having a trapezoidal cross-section which engages the groove formed in the second portion of the shank and mates with the threaded portion such that a continuous thread runs from a first end of the shank to a second end of the shank.

4. The fastener of claim 1 wherein the thread component comprises hardened carbon steel prior to engaging the shank.

5. The fastener of claim 1 wherein the thread component is hardened after engaging the shank.

6. The fastener of claim 1 wherein the thread component is mechanically secured in a groove in the second portion of the shank.

7. The fastener of claim 1 wherein the thread component is welded to the shank.

8. The fastener of claim 1 wherein the shank includes a tapered leading edge and the thread component comprises a coil mounted in a groove formed in the second portion, the coil including a diameter matching a diameter of the groove formed in the second portion and the tapered edge.

9. A threaded fastener comprising:
   a shank having a first, threaded portion including a thread extending outwardly from a shank body over a first length of the shank, and a second portion having a groove abutting and continuing the thread and including a turn ratio equal to a turn ratio of the threaded portion, the shank comprising corrosive resistant stainless steel, the groove including a trapezoidal cross-sectional profile; and
   a coil engaging the groove to fill the groove along the second portion, the coil comprising hardened steel.

10. The fastener of claim 9 wherein the coil includes a base having a trapezoidal cross-section which engages the groove matching the thread such that the coil and thread form a continuous thread from a first end of the shank to a second end of the shank.

11. The fastener of claim 10 wherein the coil comprises hardened carbon steel prior to engaging the shank.

12. The fastener of claim 10 wherein the coil is hardened after engaging the shank.

13. The fastener of claim 10 wherein the coil is mechanically secured in a groove in the second portion of the shank.

14. The fastener of claim 10 wherein the coil is welded to the shank.

15. The fastener of claim 10 wherein the shank includes a tapered leading edge and the coil includes a diameter matching a diameter of the groove formed in the second portion and the tapered edge.

* * * * *